United States Patent [19]

Crout et al.

[11] Patent Number: 5,333,918
[45] Date of Patent: Aug. 2, 1994

[54] UNITARY BRAZED TUBING FITTING ASSEMBLY WITH DEFORMED SEALING WEB

[76] Inventors: James O. Crout, 330 Crosspark Dr., Apt. 8, Jackson, Miss. 39208; Sreemukh Sanne, 100 Appleridge Dr., Branson, Miss. 39042

[21] Appl. No.: 47,547

[22] Filed: Mar. 23, 1993

[51] Int. Cl.⁵ .................................. F16L 13/08
[52] U.S. Cl. ............................ 285/286; 285/287; 285/331; 285/382; 228/173.4; 228/136; 29/509
[58] Field of Search ............ 285/286, 287, 382, 382.4, 285/382.5, 331, 382.2; 29/507, 509, 510, 511, 513; 228/173.4, 128, 129, 135, 136, 137, 154

[56] References Cited

U.S. PATENT DOCUMENTS

| | | | |
|---|---|---|---|
| 1,703,037 | 2/1929 | Heck | 228/128 |
| 1,908,020 | 5/1933 | Hulsart | 285/286 |
| 2,033,122 | 3/1936 | Cornell, Jr. | 285/287 |
| 2,166,078 | 7/1939 | Stephenson | 285/287 |
| 2,460,667 | 2/1949 | Wurzburger | 285/287 |
| 2,488,229 | 11/1949 | Noojin | 285/287 |
| 3,198,560 | 8/1965 | Collins | 285/286 |
| 3,534,986 | 10/1970 | Hartmann et al. | 285/287 |
| 4,161,273 | 7/1979 | Jeffers | 228/173.4 |
| 4,233,726 | 11/1980 | Williams | 29/507 |
| 4,887,853 | 12/1989 | Flowers et al. | 285/287 |

FOREIGN PATENT DOCUMENTS

| | | | |
|---|---|---|---|
| 499713 | 8/1992 | European Pat. Off. | 285/382.2 |
| 554605 | 7/1932 | Fed. Rep. of Germany | 285/286 |
| 3818582 | 12/1989 | Fed. Rep. of Germany | 285/331 |
| 270109 | 11/1950 | Switzerland | 285/331 |
| 242094 | 11/1925 | United Kingdom | 285/286 |

*Primary Examiner*—Eric K. Nicholson
*Attorney, Agent, or Firm*—Alexander F. Norcross

[57] ABSTRACT

A threaded fitting, having an external thread and sealing surfaces to match standard tubing fitting designs. The fitting has an internal bore which is defined by two coaxially aligned cavities; an upper cavity is the diameter to receive a standard diameter tubing end, and has a bottom end defined by a metal web which extends into the bore of the fitting a distance. This web forms a stop upon which a tubing end can be bottomed. A counter groove is cut into the fitting adjacent to the upper cavity for receiving the tubing end. In use, a brazing metal ring is inserted into the upper counter groove, and a tubing end is inserted into the first cavity, and bottomed against the web. The fitting and tubing end are then clamped or held and a tapered mandrel, of a diameter equal to the inner diameter of the tubing, is inserted upward into the second cavity; this mandrel deforms the web upward into the interior of the tubing end, forming a positive mechanical seal and lock between the tubing and fitting.

7 Claims, 1 Drawing Sheet

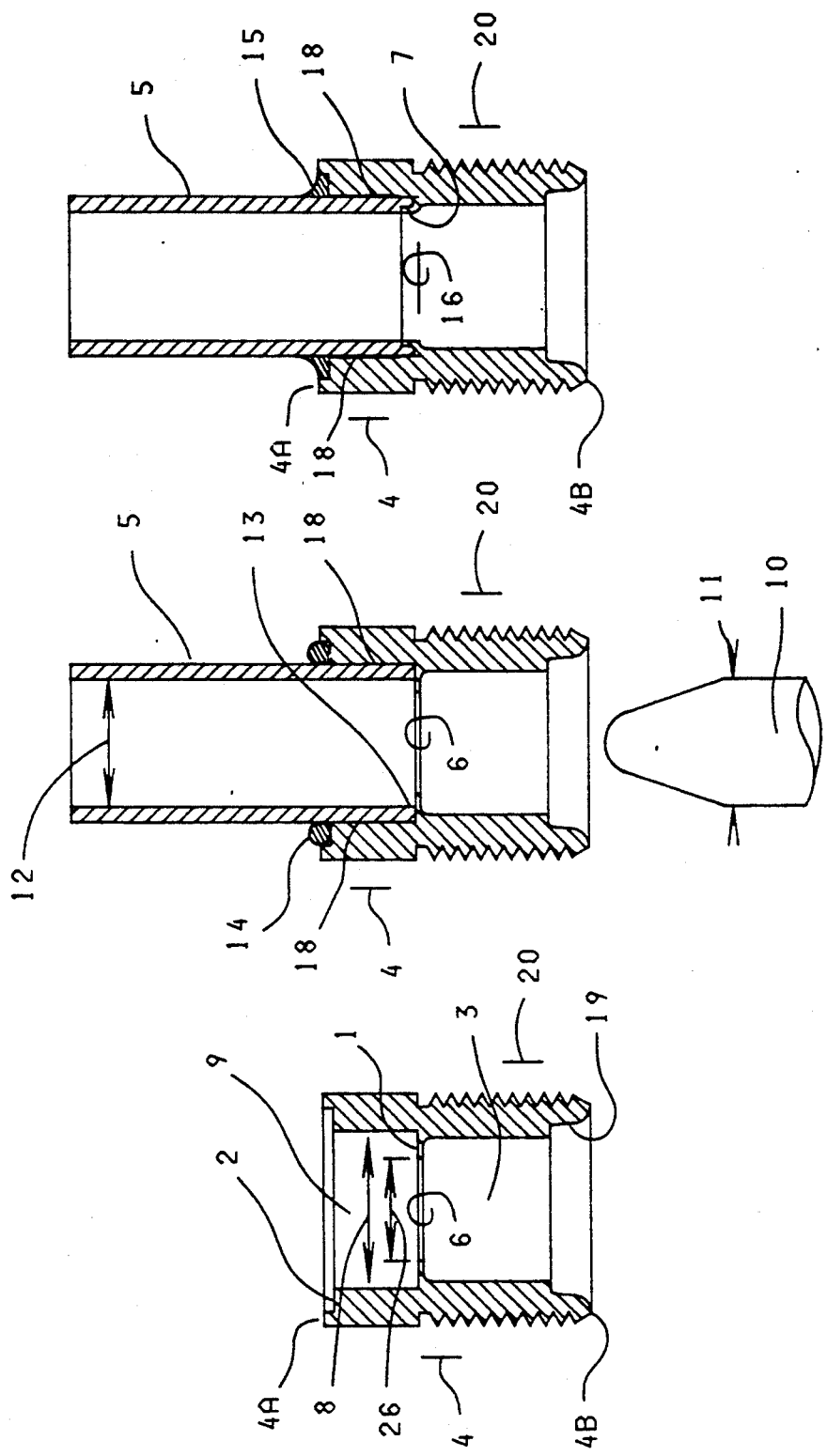

UNITARY BRAZED TUBING FITTING ASSEMBLY WITH DEFORMED SEALING WEB

BACKGROUND OF THE INVENTION

This invention relates to the field of assembled tubing and fittings, for assembly of sub components comprising metal tubing sections.

Metal tubing is assembled into a component by means of standardized metal threaded fittings which serve to provide a positive mechanical interconnection between tubing sections and which also must serve to seal the tubing to prevent leaks when fastened. Fittings are often brazed to the tubing to provide such a seal.

It is desirable to provide a unitary mechanical assembly of preformed tubing sections with installed fittings. To insure proper assembly and seal of fitting to tubing end, the fitting is assembled onto the tube end and brazed to the tubing. Uneven expansion rates encountered in the brazing process can cause separation forces between tubing end and fitting, breaching the brazed seal. Additionally, during the brazing step the brazing material or solder is free flowing, and the flow of this brazing material must be controlled to prevent loss of seal or contamination of fitting surfaces by brazing material.

U.S. Pat. No. 4,887,853 discloses a fitting and process for mechanical assembly of the fitting to a tubing end prior to brazing. However the disclosed fitting requires the machining of an internal undercut counter bore within the fitting as well as the use of a stepped mandrel to expand the tubing end into the counter bore. The resulting assembly is difficult to inspect for complete sealing, and is not designed to prevent flow of brazing metal into the interior bore of the fitting.

SUMMARY OF THE INVENTION

The invention is of an improved fitting for assembly and brazing to a tubing end and the method of assembly of such a fitting to the tubing end.

The fitting is a threaded fitting, having an external thread and sealing surfaces to match standard tubing fitting designs. The fitting has an internal bore which is formed by two coaxially aligned cavities. An upper cavity is of a diameter to receive and hold a standard diameter tubing end, and has a bottom end defined by a metal web which extends for a distance into the bore of the fitting. This web forms a stop upon which a tubing end can be bottomed. A second cavity, below the web, is of the standard diameter required for mating with standard fittings, as known in the art.

At the top end of the fitting, coaxially around the bore, a counter groove is cut into the fitting. A brazing metal ring is inserted into this upper counter groove, and a tubing end is inserted into the first cavity, and bottomed against the web. The fitting and tubing end are then clamped or held in position and a tapered mandrel, of a diameter equal to the inner diameter of the tubing, is inserted upward into the second cavity; this mandrel deforms the web upward into the interior of the tubing end around the end of the tubing, forming a positive mechanical seal and lock between the tubing and fitting.

The locked assembly is then passed through a brazing furnace, melting the braze ring, brazing the fitting to the tube. The counter bore retains the braze metal in position to properly seal the fitting and tube. The positive internal seal formed by the web being folded over the tubing end within the fitting bore prevents any flow of braze metal into the interior of the fitting, keeping the internal bore clean and the sealing surfaces of the assembled fitting and tube free of contamination.

BRIEF DESCRIPTION OF THE FIGURES

FIG. 1 is a side cutaway view of the fitting of the invention.

FIG. 2 is a side cutaway view of the assembled tubing end and fitting prior to locking the tubing end and fitting together.

FIG. 3 is a side cutaway view of the assembled tubing end and fitting after locking and brazing.

DETAILED DESCRIPTION OF THE INVENTION

FIG. 1 shows in side sectional view the fitting of the invention. This fitting 4 is, as is known from standards for fittings, a threaded fitting with an exterior threaded section 20, and a sealing seat surface 19. Both the thread 20 and the sealing surface 19 are defined by known industry standards for interconnection with matching fittings to permit interconnection of metal tubing sections with each other or with other components for controlled fluid flow, and are not further discussed here.

Fitting 4 has an internal bore 6 formed of upper and lower coaxially aligned cavities separated by a web 1. Lower cavity 3 of the fitting 4 is formed to mate with matching fittings. Coaxially aligned upper cavity 9 in the fitting forms a continuation of this inner bore 6. Upper cavity 9 has an internal diameter 8 which matches the outer diameter of a tubing section 5. Between upper cavity 9 and lower cavity 3, separating the cavities, is an internal web 1, intermediate the top 4A and bottom 4B of the fitting 4. Web 1 is a flat, disc like protrusion, which extends a distance into the bore, and which forms a stop upon which an inserted tubing section 5 can rest. Web 1 has the form of a hollow centered disk extending inwardly from the wall of the bore 6, intermediate the ends of the fitting 4. The Internal diameter 26 of the web 1.

At the top 4A of the fitting 4, around the upper end of the upper cavity 9 is formed a counter sunk groove 2, forming a recess in the fitting 4 around the bore 6.

In use, a braze ring 14, of brazing metal, is inset into the counter sunk groove 2. Then the end of a tubing section 5 is inserted into the upper cavity 9 until the tubing end 13 rests on the internal web 1 as a stop. The fitting 4 and tubing section 5 are then held in position as a tapered mandrel 10, having an outer diameter 11 equal to the inner diameter 12 of the tubing section 5, is driven up into the fitting and tubing assembly. The tapered end of the mandrel 10 deforms the web 1, which is extruded up and over the seated end 13 of the tubing section 5, forming a closed sealing lip 7 around the end 13 of the tubing section 5, creating a continuous mechanical interlock and seal around the end 13 of the tube against the fitting 4.

This locked assembly of tubing and fitting is then passed through a brazing furnace, melting the braze ring 14. The counter sunk groove 2 retains the molten braze metal, controlling flow of the molten braze metal into the space 18 between the tubing 5 and the inner wall of the upper bore 9, fastening the assembly of tubing and fitting. The braze metal in the space 18, and to a lesser extent, that metal retained in the groove 2, forms a strong braze joint 15, sealing and fastening the tube 5 and fitting 4 into a sealed, unitary assembly. Some molten braze metal will flow down. The continuous mechanical interlock 7 prevents the flow of this braze metal into the interior bore 3 or onto the sealing surfaces 14 of the fitting.

The inventive fitting does not have any under cut areas within its internal bore. Thus the fitting may be manufactured by machining or by extrusion within dies, or by die punching blank fittings. This simplified internal bore of the inventive fitting reduces manufacturing steps and cost in comparison with the prior art fittings.

Of greater importance, the inventive fitting provides for a positive, sealed mechanical interlock of tubing and fitting which holds the assembled tubing and fitting in position during brazing, despite the effects of uneven thermal expansion and which positively prevents flow of brazing metal into the interior bore of the fitting. The fitting further positively provides for retention of the braze metal during brazing to insure a uniformly strong braze fillet joining fitting to tubing for a more reliable assembly.

It will be readily apparent to those skilled in the art how variations in the formation of the web may be accomplished to adapt the fitting to a range of standard tubing and fitting sizes.

We claim:

1. A fitting for brazed assembly to a tubing end comprising:
   a threaded fitting having an inner bore therein;
   a deformable web extending from the wall of the fitting into said bore intermediate an upper end and a lower end of said fitting;
   said web forming a stop for receiving the end of a tubing section inserted into the inner bore of said fitting:
   said web sealingly deformed into said tubing section end.

2. The apparatus of claim 1 further comprising:
   a braze ring receiving counter sunk groove recessed into the upper end of said fitting, coaxially around the bore thereof.

3. The apparatus of claim 1 further comprising:
   a tubing section inserted within said bore against said web;
   said web being extruded up over the end of said tubing, forming thereby a unitary sealed mechanical interlock between tubing and fitting.

4. The apparatus of claim 2 further comprising:
   a tubing section inserted within said bore against said web;
   said web being extruded up over the end of said tubing, forming thereby a sealed mechanical interlock between tubing and fitting
   said braze ring being melted to form a braze fillet, sealing said tubing to said fitting.

5. A method of forming a unitary assembly of fitting and tubing comprising:
   forming a threaded fitting with an internal bore;
   forming within said bore an inwardly extending disk shaped web intermediate the ends of the fitting;
   inserting a tubing end into said fitting bore, seating the end of said tubing against said web;
   deforming said web against the end of said tubing forming thereby a uniform, mechanically interlocked seal between said tubing and said fitting.

6. The method of claim 5 further comprising:
   forming a braze ring retaining counter sunk groove in an upper end of said fitting coaxially around said bore;
   providing a braze ring within said groove; and
   subsequent to the step of deforming said web, heating said fitting and tubing to a brazing heat, melting the braze ring, forming thereby a brazed fillet connection between said tubing and fitting within said countersunk groove, said mechanically interlocked seal preventing the flow of braze metal into the bore of the fitting.

7. A unitary assembly of tubing and fitting comprising:
   a threaded fitting having a top end and an internal bore therein;
   a web extending into said bore;
   a counter sunk groove in said top end, around said bore;
   a tubing section insert into said bore against said web;
   said web being deformed over the end of said tubing section, forming a seal between said tubing and said fitting;
   a brazed fillet in said groove, fastening said fitting to said tubing.

* * * * *